C. O. BERGSTROM.
LUBRICATION.
APPLICATION FILED FEB. 14, 1916.
1,265,991.
Patented May 14, 1918.
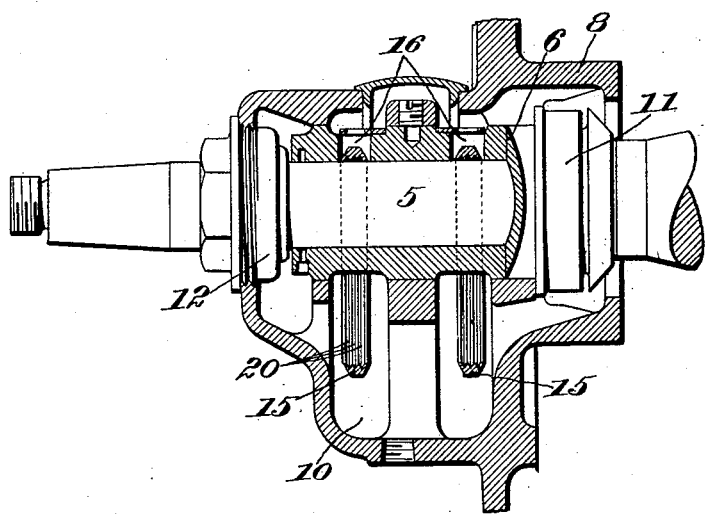
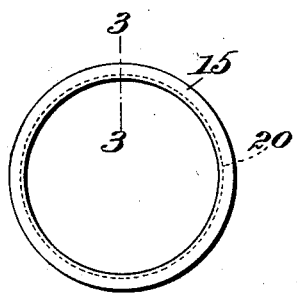
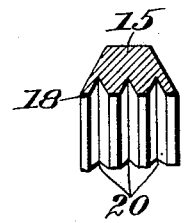
Inventor
Carl O. Bergstrom
by Phillips Van Everen & Fish
Attys

UNITED STATES PATENT OFFICE.

CARL O. BERGSTROM, OF BOSTON, MASSACHUSETTS, ASSIGNOR TO B. F. STURTEVANT COMPANY, OF BOSTON, MASSACHUSETTS, A CORPORATION OF MASSACHUSETTS.

LUBRICATION.

1,265,991.     Specification of Letters Patent.     Patented May 14, 1918.

Original application filed August 12, 1912, Serial No. 714,618. Divided and this application filed February 14, 1916. Serial No. 78,181.

*To all whom it may concern:*

Be it known that I, CARL O. BERGSTROM, a citizen of the United States, residing at Boston, in the county of Suffolk and Commonwealth of Massachusetts, have invented certain new and useful Improvements in Lubrication; and I do hereby declare the following to be a full, clear, and exact description of the invention, such as will enable others skilled in the art to which it appertains to make and use the same.

The present invention relates to lubrication, and more particularly to improvements in devices for lubricating shafts or other members rotating at a comparatively high speed.

The present application is a division of the copending application of applicant, Serial No. 714,618, filed August 12th, 1912.

The object of the present invention is to provide certain improvements in lubricating rings which are employed for transferring a lubricating medium from a reservoir to a rotating shaft to lubricate the bearing for the shaft.

With this object in view the features of the invention consist in certain novel features of construction, combinations and arrangements of parts hereinafter described and claimed, the advantages of which will be apparent to those skilled in the art from the following description.

In the drawings which illustrate the preferred form of the invention, Figure 1 is a longitudinal elevation, partly in section, of a shaft and bearing with the lubricating rings dependent therefrom; Fig. 2 is a detail view illustrating a side elevation of one of the rings; and Fig. 3 is a sectional view taken upon the line 3—3 of Fig. 2.

In the illustrated embodiment of the invention a shaft 5 for an electric motor or generator or other high speed machine, is journaled at one end in a bronze bearing block 6 which is supported in a bearing box 8 having an oil reservoir 10 formed in the lower portion below the shaft bearing. The shaft is provided with oil deflectors indicated generally at 11 and 12, and located at opposite ends of the bearing box to prevent oil from leaking out of the bearing box into the machine.

It is customary to lubricate high speed bearings of this type by one or more lubricating rings which depend from the rotating shaft and are rotated at a comparatively slow speed with respect to the speed of the shaft to convey oil from the reservoir in the lower portion of the bearing box to the top of the shaft, from which point it is drawn into the bearing. Considerable difficulty has been experienced in constructing these lubricating rings, as it is necessary that the rings shall be capable of a free rotation and yet have sufficient frictional engagement with the shaft to cause a comparatively uniform rotation of the rings in order that the supply of oil to the shaft shall be maintained substantially constant. It is desirable, furthermore, that the rings shall not deliver an excess supply of oil to the shaft, as in this case a film of oil is formed between the shaft and the inner surface of the ring upon which the ring floats. This film of oil temporarily stops the rotation of the ring, owing to the cessation of the frictional drag upon the ring tending to rotate it, and in consequence a fresh supply of oil is not fed to the bearing. When this occurs the supply of oil in the bearing is not maintained constant but is more or less intermittent.

According to the present invention the oil is conveyed from the reservoir to the top of the shaft by a plurality of lubricating rings 15 which depend from the shaft and run in parallel-sided slots 16 formed in the top of the bearing 6. Each ring fits the respective slot in the bearing fairly closely to prevent any wabbling of the ring during the operation of the shaft, and in order to permit a comparatively free rotation of the ring and minimize to the greatest possible extent the friction between the faces of the ring and the sides of the slot 16, the faces of the ring are tapered inwardly from the inner to the outer surface of the ring so that the rings have a substantially trapezoidal cross-section, as shown clearly in Figs. 1 and 3 of the drawings. With this construction only the lower edge 18 of the ring comes in contact with the sides of the guiding slots 16, and the tendency of the ring to adhere to the sides of the slot, which is very great in the ordinary type of rectangular ring, is practically obviated. In order to prevent the transfer of an excess of oil to the top of the rotating shaft, a series of V-shaped annular channels 20 are formed in the inner surface of the ring. The centrifugual force due to the rotation of the ring causes the oil to be maintained in the channels and delivered to the top of the shaft. In addition, the channels permit the excess supply of oil to be carried over the shaft without forming a film of oil upon the shaft which separates the ring sufficiently to retard its rotation. The provision of the grooves in the inner surface of the ring tends to convey a uniform amount of oil to the rotating shaft and successfully cares for any excess of oil which may be carried to the top of the shaft while preventing any damming up of the oil between the inside of the ring and the shaft.

While the preferred embodiment of the present invention has been specifically illustrated and described, the present invention is not limited to the construction constituting its preferred embodiment, but may be embodied in other constructions within the scope of the invention as defined in the following claims:

1. The combination with a rotating shaft, of a stationary bearing having a parallel sided slot formed therein, and a lubricating ring supported by the shaft within the slot, having side faces tapering inwardly from the inner to the outer surface of the ring and having a series of annular grooves formed in the inner surface of the ring, the widest portion of the ring fitting the slot with sufficient closeness to prevent wabbling of the ring while permitting a fairly free rotation thereof within the slot.

2. The combination with a rotating shaft, of a stationary bearing having a parallel sided slot formed therein, and a lubricating ring supported by the shaft within the slot, having side faces tapering inwardly from the inner to the outer surface of the ring and having a series of annular V-shaped grooves formed in the inner surface of the ring, the widest portion of the ring fitting the slot with sufficient closeness to prevent wabbling of the ring while permitting a fairly free rotation thereof within the slot.

CARL O. BERGSTROM.

Copies of this patent may be obtained for five cents each, by addressing the "Commissioner of Patents, Washington, D. C."